United States Patent [19]

Yoshino et al.

[11] Patent Number: 5,747,691
[45] Date of Patent: May 5, 1998

[54] ANGULAR VELOCITY SENSOR APPARATUS

[75] Inventors: Yoshimi Yoshino, Anjo; Kenzi Kato, Okazaki, both of Japan

[73] Assignee: Nippondenso Co., Ltd., Kariya, Japan

[21] Appl. No.: 612,394

[22] Filed: Mar. 7, 1996

[30] Foreign Application Priority Data

Mar. 8, 1995 [JP] Japan .................... 7-048848

[51] Int. Cl.$^6$ ..................................... G01P 3/44
[52] U.S. Cl. .......................... 73/504.16; 310/329
[58] Field of Search .................... 73/504.16, 504.04, 73/504.15, 504.12; 310/321, 329, 351, 370, 332, 367

[56] References Cited

U.S. PATENT DOCUMENTS

| | | |
|---|---|---|
| 4,598,585 | 7/1986 | Boxenhorn . |
| 4,628,734 | 12/1986 | Watson . |
| 4,694,696 | 9/1987 | Hojo et al. ............ 73/497 |
| 4,699,006 | 10/1987 | Boxenhorn . |
| 5,016,072 | 5/1991 | Greiff . |
| 5,216,315 | 6/1993 | Terada et al. ............ 310/329 |
| 5,216,490 | 6/1993 | Greiff et al. . |
| 5,349,857 | 9/1994 | Kasanami et al. . |
| 5,386,726 | 2/1995 | Terajima ............ 73/505 |
| 5,461,916 | 10/1995 | Fujii et al. . |
| 5,481,913 | 1/1996 | Ito et al. ............ 73/504.16 |
| 5,500,549 | 3/1996 | Takeuchi et al. ............ 257/415 |
| 5,504,356 | 4/1996 | Takeuchi et al. ............ 257/254 |

FOREIGN PATENT DOCUMENTS

| | | |
|---|---|---|
| 61-114123 | 5/1986 | Japan . |
| 4-134208 | 5/1992 | Japan . |
| 4-142420 | 5/1992 | Japan . |

*Primary Examiner*—Hezron E. Williams
*Assistant Examiner*—Richard A. Moller
*Attorney, Agent, or Firm*—Cushman, Darby & Cushman IP Group of Pillsbury Madison & Sutro LLP

[57] ABSTRACT

A frame body and a tuning fork-shaped vibratory element are made of a single crystalline silicon substrate. The vibratory element has arms extending parallel to each other. The respective sides of the frame body are located face to face with a predetermined distance from the arms. Thin portions are formed between thick portions located partially on the arms of the vibratory element. Piezo-resistant elements for detecting angular velocity are disposed on the thin portions. When electrostatic force is imposed between the sides of the frame body and the arms, the arms are excited to vibrate. At this time, when angular velocity is imposed, the arms vibrate in the direction crossing at right angles with the excited direction. The piezo-resistant elements detect vibration of the arms caused by the angular velocity with stabilized characteristics and higher sensitivity.

31 Claims, 9 Drawing Sheets

ANGULAR VELOCITY SENSOR APPARATUS

CROSS REFERENCE TO RELATED APPLICATION

This application is based upon and claims the benefit of priority of the prior Japanese Patent Application No. 7-48848 filed on Mar. 8, 1995, the contents of which are incorporated herein by reference.

BACKGROUND OF THE INVENTION

1. Field of the Invention

The present invention relates to an angular velocity sensor apparatus detecting angular velocity or yaw rate.

2. Related Arts

A piezoelectric vibratory angular velocity sensor shown in FIG. 15 is conventionally used as a sensor for detecting angular velocity of a vehicle. This vibratory angular velocity sensor detects angular velocity by vibrating a tuning fork-shaped vibratory element 40 in the x axial direction and detecting the vibration of the vibratory element 40 in the direction crossing at right angles (in the y axial direction) with the vibratory direction caused by angular velocity. As for a detailed explanation of a process to manufacture such a sensor, driving piezoelectric elements 42a and 42b are stuck on a U-shaped driving plate 41 made of such an identity elastic metal as Elinvar. While sticking a detecting piezoelectric element 44a on a detecting plate 43a made of an identity elastic metal, another detecting piezoelectric element 44b is stuck on another detecting plate 43b made of an identity elastic metal. Next, the upper surfaces of the driving plate 41 are bonded at right angles to the lower surfaces of the detecting plates 43a and 43b. A lead wire 45 is soldered with each of the piezoelectric elements 42a, 42b, 44a and 44b which are electrically connected to the electrodes of a print board (not shown in the figure). Expansion and contraction of the driving piezoelectric elements 42a and 42b excitedly vibrate the driving plate 41 and the detecting plates 43a and 43b in the x axial direction in the figure, then, the detecting piezoelectric elements 44a and 44b output the vibration in the y axial direction of the detecting plates 43a and 43b caused by angular velocity as an electric signal for measurement.

However, in the above-described conventional angular velocity sensor, characteristics fluctuate largely depending on how accurately the driving plate 41; and the detecting plates 43a and 43b are stuck to the piezoelectric elements 42a, 42b, 44a and 44b, and the driving plate 41 is bonded at right angles to the detecting plates 43a and 43b. To make the fluctuation of the characteristics smaller, the piezoelectric elements 42a, 42b, 44a and 44b have to be accurately stuck to the driving plate 41, the detecting plates 43a and 43b, respectively, in addition to bonding the driving plate 41 to the detecting plates 43a and 43b exactly at right angles, which results in higher manufacturing cost.

SUMMARY OF THE INVENTION

The present invention has an object to provide an angular velocity sensor apparatus having stabilized characteristics and high sensitivity manufactured with lower cost.

An angular velocity sensor apparatus according to the present invention comprises a vibratory element having arms in a tuning-fork shape extending parallel to each other and detects vibration, which is induced by the imposed angular velocity during an excitation of the arms, in the direction crossing at right angles with the excited direction. Importantly, the vibratory element is made of silicon, thin portions are partially formed between thick portions of the arms, and strain sensitive elements for detecting the imposed angular velocity are disposed on the thin portions.

According to the present invention, the arms of the tuning fork-shaped vibratory element made of silicon are excited to vibrate. When angular velocity is imposed, the arms are induced to vibrate in the direction crossing at right angles with the excitation direction. The strain sensitive elements disposed on the thin portions of the arms detect the induced vibration. Herein, an angular velocity sensor apparatus of the present invention can be fabricated by using silicon micromachining technology, and thus the elements for detecting angular velocity can be formed without sticking them to the detecting plates, which results in an angular velocity sensor apparatus with stabilized characteristics.

Furthermore, because the strain sensitive elements are disposed on the thin portions formed partially on the arms, the thick portions at the top can function as masses (weight portions), thus, strain in the thin portions becomes larger to enable detection of angular velocity with higher sensitivity.

Preferably, single crystalline silicon and piezo-resistant elements formed thereon are applicable to the aforementioned silicon and the strain sensitive elements, respectively.

The vibratory element can be manufactured by etching out predetermined regions of a silicon substrate. Herein, the etching method makes it possible to precisely dispose fixed electrodes so as to manufacture the arms of the vibratory element with a predetermined distance interposed therebetween. The arms are excited to vibrate by imposing electrostatic force or piezoelectric force between the arms and the fixed electrodes separately disposed. That is to say, unlike the conventional apparatus, the driving plate does not have to be bonded at right angles with the detecting plates, and therefore cost reduction can be further promoted.

Moreover, PN junction isolation is applicable to the electrical separation between the arms and the fixed electrodes. By means of this, the electrical separation can be achieved without difficulties by using ordinary technology to manufacture a semiconductor device.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PRESENTLY PREFERRED EXEMPLARY EMBODIMENTS

A first preferred embodiment of the present invention is hereinafter described with reference to the accompanying drawings.

Figure 1:
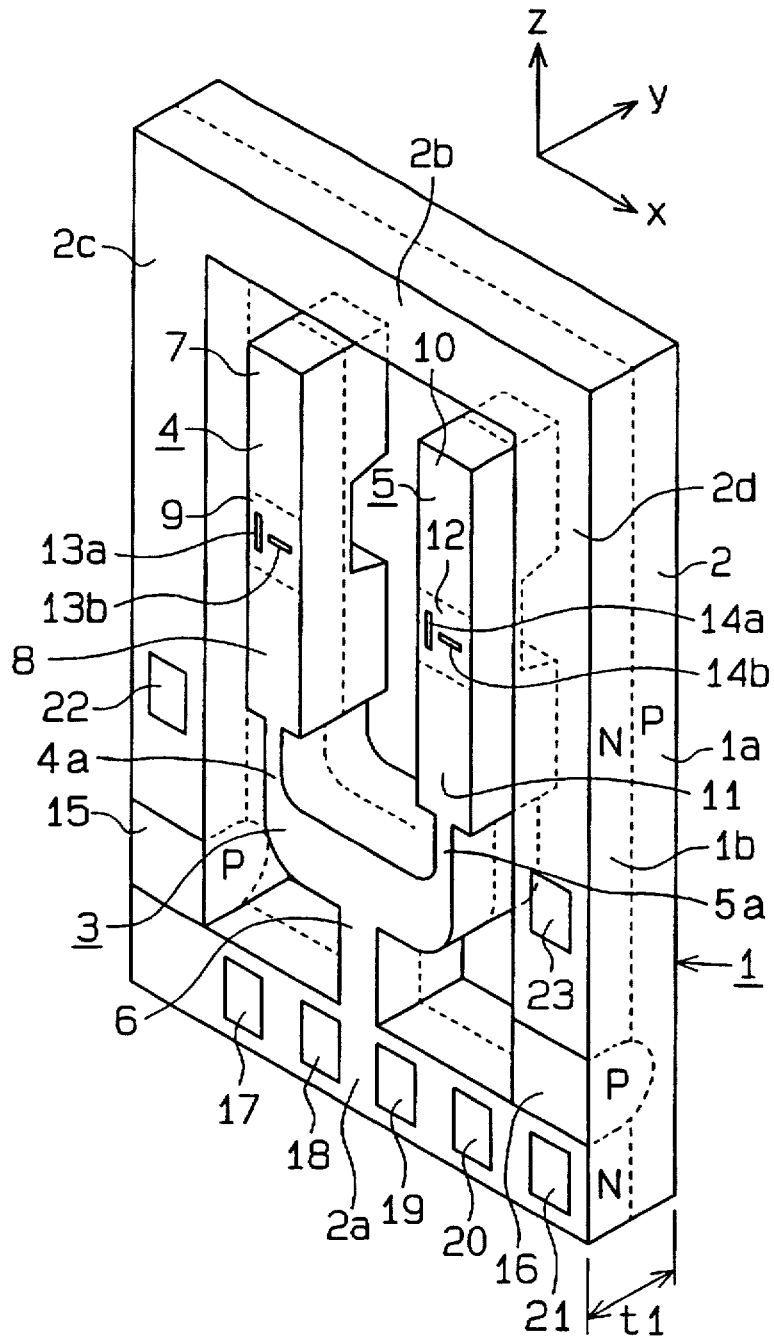
FIG. 1 is a perspective view of an angular velocity sensor element of a first embodiment.
Figure 2:
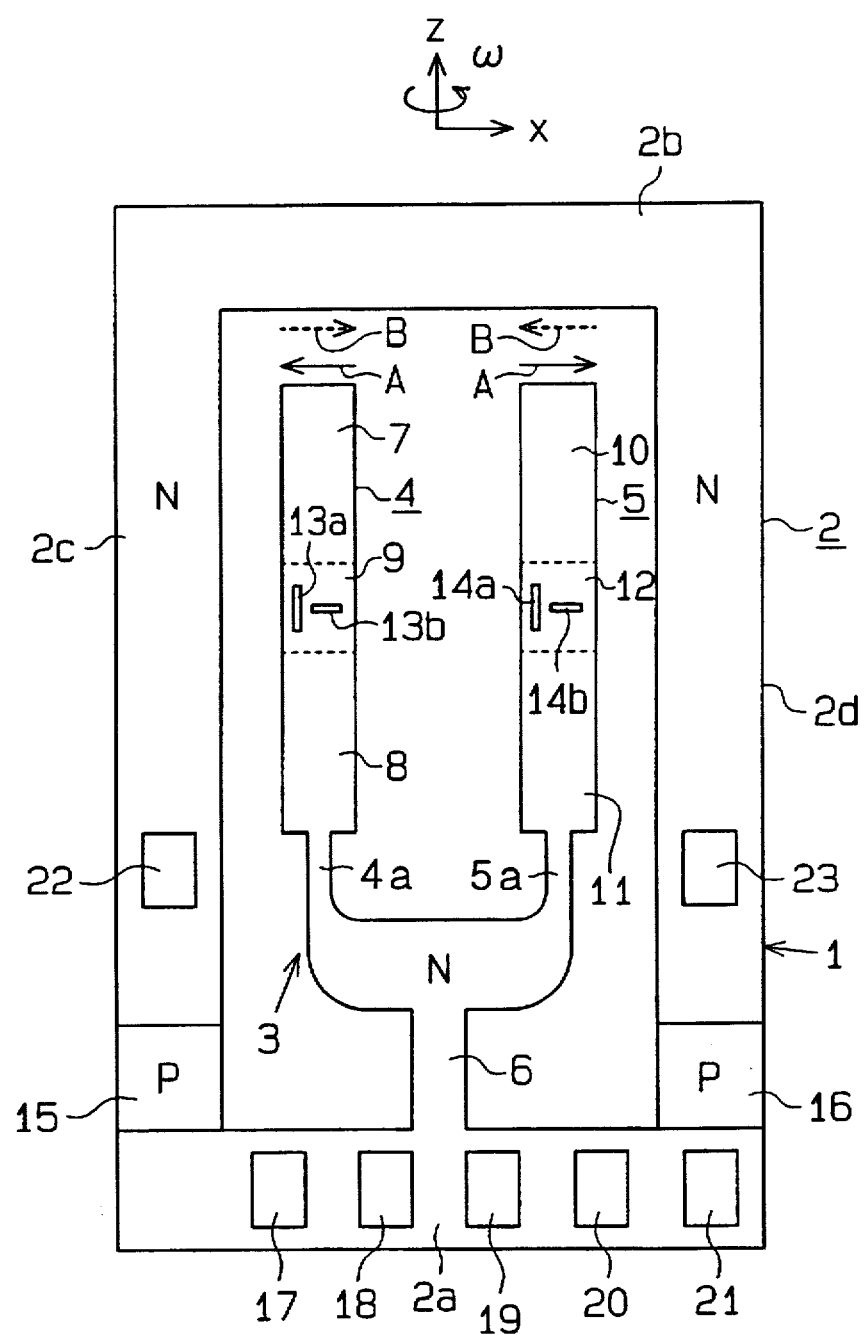
FIG. 2 is a front elevation view of the angular velocity sensor element of the first embodiment.

FIG. 1 is a perspective view of an angular velocity sensor element (a sensing element) of the present embodiment. FIG. 2 shows a plan view of the sensing element. For the following explanation, the horizontal, forward and backward, and perpendicular directions are called x, y and z axes, respectively in a three-axial rectangular coordinates.

The present angular velocity sensor element is made of a single crystalline silicon substrate 1 with a predetermined thickness t1. The silicon substrate 1 includes a P-type single crystalline silicon substrate 1a and an epitaxially grown N-type silicon layer 1b thereon. A square ring-shaped frame body 2 and a tuning fork-shaped vibratory element 3 are dividably formed by etching predetermined regions out of the single crystalline silicon substrate 1 and cutting them with dies. The frame body 2 is composed of a bottom part 2a, a top part 2b and two side parts 2c and 2d. The tuning fork-shaped vibratory element 3 is supported by the bottom part 2a. The bottom part 2a and the top part 2b of the frame body 2 extend in the x axial direction while the side parts 2c and 2d extend in the z axial direction.

In the present embodiment, the side parts 2c and 2d of the frame body 2 have fixed electrode portions.

The vibratory element 3 comprises a pair of arms 4 and 5 extending parallel to each other and a connecting portion 6 connecting the arms 4 and 5 to the frame body 2. The side parts 2c and 2d of the frame body 2 are disposed face to face with a predetermined space from each arm 4 and 5 extending in the z axial direction.

Both arms 4 and 5 of the vibratory element 3 are prism-shaped. A thin portion 9, which is a portion thinned in the y axial direction, is formed at the middle of the arm 4 between thick portions 7 and 8. The thick portion 7 located closer to the end of the arm 4 than the thin portion 9 functions as a mass (a weight portion). A thin portion 12 is similarly formed at the middle of the arm 5 between thick portions 10 and 11. The thick portion 10 located closer to the end of the arm 5 than the thin portion 12 functions as a mass (a weight portion). Furthermore, both arms 4 and 5 are connected to the connecting portion 6 of the vibratory element 3 through root portions 4a and 5a thinned in the x axial direction, respectively.

Piezo-resistant elements 13a and 13b as strain sensitive elements are formed on the N-type silicon layer 1b of the thin portion 9 of the arm 4. Piezo-resistant elements 14a and 14b are also formed on the N-type silicon layer 1b of the thin portion 12 of the arm 5. Sash- or strip-shaped piezo-resistant elements 13a, 13b, 14a and 14b are formed by doping the N-type silicon layer 1b with P-type impurities. While the piezo-resistant elements 13a and 14a extend in the z axial direction, the piezo-resistant elements 13b and 14b extend in the x axial direction.

A P-type impurity diffusion region 15, the diffusion depth of which reaches the P-type single crystalline silicon substrate 1a, is formed in the N-type silicon layer 1b at the bottom of the side part 2c of the frame body 2. A P-type impurity diffusion region 16 reaching the P-type single crystalline silicon substrate 1a is also formed in the N-type silicon layer 1b at the bottom of the side part 2d of the frame body 2. PN junctions by the P-type impurity diffusion regions 15 and 16 isolates and separates the N-type silicon layer 1b of the bottom part 2a of the frame body 2 from the N-type silicon layer 1b of the other regions (2b, 2c and 2d). That is, the N-type silicon layer 1b in the vibratory element 3 and the bottom part 2a of the frame body 2 is electrically isolated from the N-type silicon layer 1b at the top part 2b and the side parts 2c and 2d of the frame body 2. The N-type silicon layer 1b at the side parts 2c and 2d of the frame body 2 serves as a fixed electrode, and the N-type silicon layer 1b in the vibratory element 3 (more specifically, arms 4 and 5) serves as a movable electrode to be excited.

A series of square electrodes (bonding pads) 17, 18, 19, 20 and 21 is disposed on the surface of the bottom part 2a of the frame body 2. The electrode 21 electrically contacts with the N-type silicon layer 1b at the bottom part 2a of the frame body 2.

Square electrodes (bonding pads) 22 and 23 are disposed on the surface of the side parts 2c and 2d of the frame body 2. Both electrodes 22 and 23 electrically contact with the N-type silicon layer 1b at the side parts 2c and 2d and the top part 2b of the frame body 2.

Figure 3:
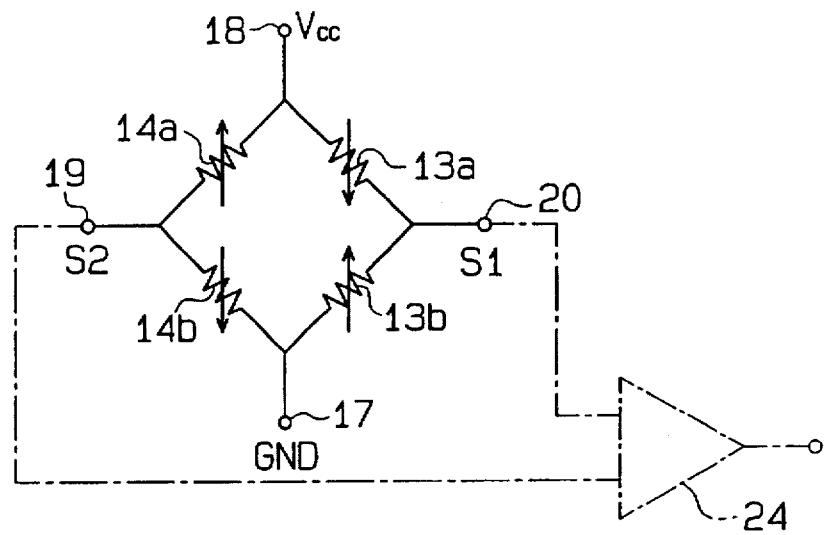
FIG. 3 is an electric circuit diagram illustrating an electric construction of the angular velocity sensor of the first embodiment.

FIG. 3 shows electric connection among the four piezo-resistant elements 13a, 13b, 14a and 14b, which are full-bridged. The aforementioned electrode for grounding 17 (GND) is connected between the piezo-resistant elements 14b and 13b. The electrode for the power source 18 (Vcc) is connected between the piezo-resistant elements 13a and 14a. The electrode for detection 19 (S2) is connected between the piezo-resistant elements 14a and 14b. The other electrode for detection 20 (S1) is connected between the piezo-resistant elements 13a and 13b. Thus, the full-bridge circuit composed of four piezo-resistant elements 13a, 13b, 14a and 14b detects the resistance variations of the elements as voltage change.

Electric connections among respective piezo-resistant elements 13a, 13b, 14a and 14b as well as among the piezoresistant elements 13a, 13b, 14a and 14b and the electrodes 17–20 are made by a wiring of the impurity diffusion region formed on the N-type silicon layer 1b and/or an aluminum wiring. The electrodes 17–23 are connected to a printed circuit board by bonding wires (not illustrated). Via the printed circuit board having a control circuit, grounding potential is applied to the grounding electrode 17 and power source voltage Vcc is also applied to the power source electrode 18 as shown in FIG. 3. The control circuit of the printed circuit board has a differential amplifier 24 shown with a one-dot chain line in FIG. 3, of which input terminals are connected to the detecting electrodes 19 and 20, respectively. The differential amplifier 24 amplifies and outputs potential difference between the detecting electrodes 19 and 20 in the full-bridge circuit.

Figure 4:
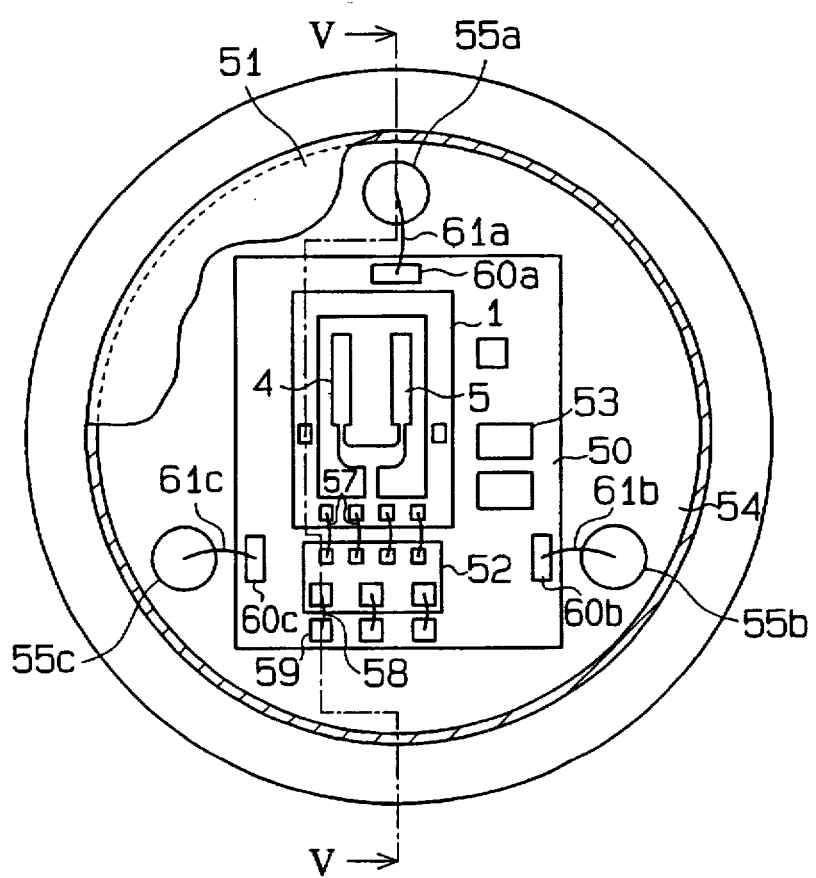
FIG. 4 is a plan view illustrating an assembly example in which an angular velocity sensor element is installed.
Figure 5:
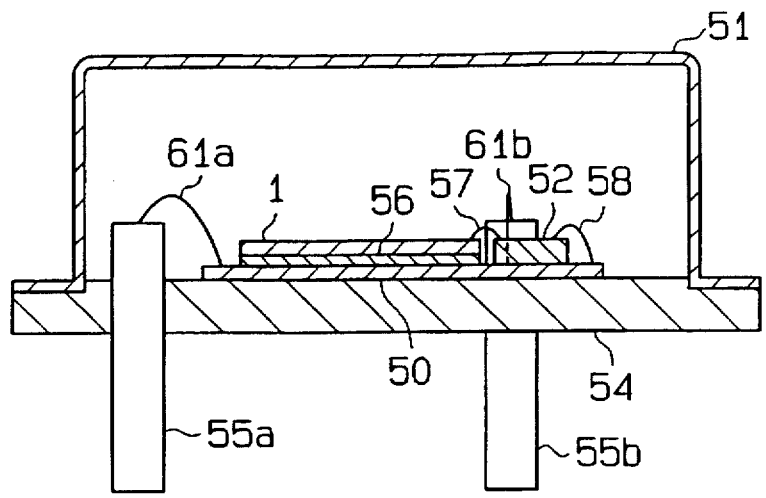
FIG. 5 is a sectional view taken along line V—V of FIG. 4.

An assembly example in which the angular velocity sensor element of the present embodiment is installed is hereinafter described with reference to FIGS. 4 and 5. FIGS. 4 and 5 show the state that the sensor element constructed as above in the single crystalline silicon substrate 1 is disposed on a ceramic substrate 50 and can-packaged. FIG. 4 shows a plan view of the sensor assembly and also partially shows the inside of a can 51. FIG. 5 shows a sectional view taken along line V—V of FIG. 4. The silicon substrate (sensor element) 1, a signal processing circuit 52, a driving circuit (not shown) and a thick-film resistor 53 are mounted on the ceramic substrate 50 to compose a hybrid IC structure. This hybrid IC structure is fixed on a stem 54 and is air-tightly packaged by the can 51. The stem 54 pierced with lead pins 55a, 55b and 55c is hermetically sealed. As shown in FIG. 5, the silicon substrate (sensor element) 1 is so fixed on the ceramic substrate 50 with a spacer 56 interposed therebetween as to enable the arms 4 and 5 of the silicon substrate (sensor element) 1 to vibrate with respect to the ceramic substrate 50. The output signal from the silicon substrate (sensor element) 1 is transmitted to the signal processing circuit 52 via a bonding wire 57 and processed by the circuit 52. Then, the signal is output to a pad 59 of the ceramic substrate 50 via a bonding wire 58, transmitted from the pad 59 to another pad 60a through an inner conductor and the like, and output externally from the lead pin 55a via a bonding wire 61a. The lead pin 55b, the bonding wire 61b and the pad 60b supply power source voltage Vcc. The lead pin 55c, the bonding wire 61c and the pad 60c supply grounding potential.

A process to fabricate the angular velocity sensor element shown in FIGS. 1 and 2 is hereinafter explained.

Figure 6:
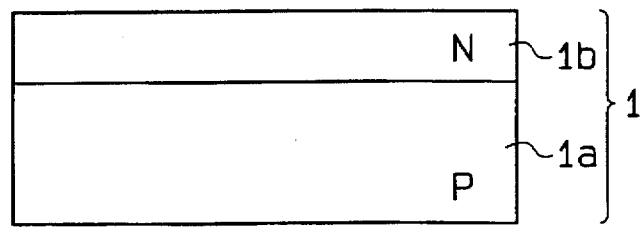
FIGS. 6, 7, 8 and 9 are sectional views to explain a process to fabricate the angular velocity sensor of the first embodiment.
Figure 7:
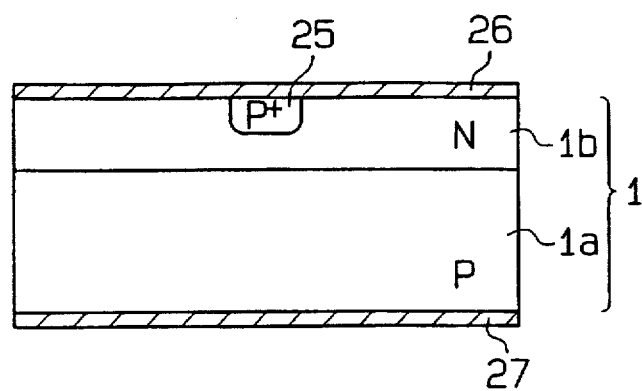

An N-type silicon layer 1b is epitaxially grown over a P-type single crystalline silicon substrate 1a as shown in FIG. 6. P-type impurities are then diffused to a predetermined region of the epitaxial silicon layer 1b to form the P-type diffusion regions 15 and 16 shown in FIGS. 1 and 2 for isolation. Next, N-type impurities are implanted into the surface of the N-type silicon layer 1b as shown in FIG. 7 to form the piezo-resistant elements 13a, 13b, 14a and 14b composed of the P$^+$-type diffusion region 25. Then, the main surface and rear surface of the single crystalline silicon substrate 1 are coated with silicon nitride films 26 and 27, respectively.

Figure 8:
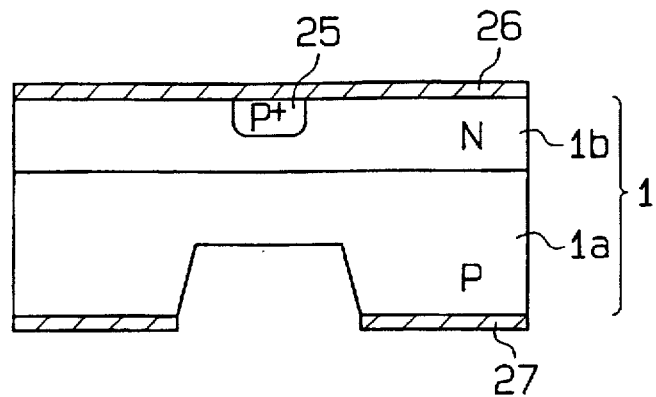
Figure 9:
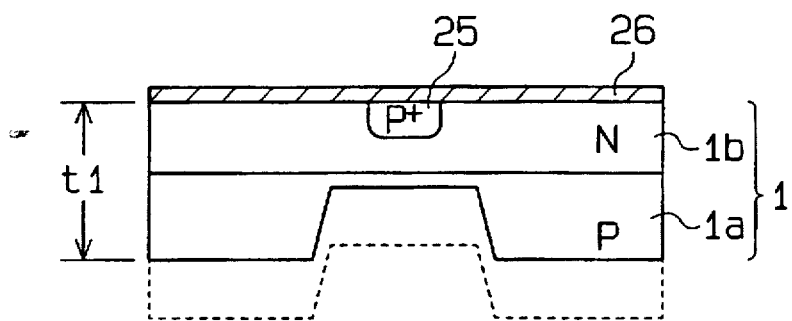

As show in FIG. 8, the silicon nitride film 27 is patterned to have openings positioned corresponding to the formation regions of the thin portions 9 and 12. At this time, the silicon nitride film 27 is simultaneously patterned to have an opening (not illustrated in FIG. 8) along the regions to be etched out as the space between the regions for the frame body 2 and the regions for the vibratory element 3. That is, the configurations of the frame body 2 and the vibratory element 3 are determined by the pattern of the silicon nitride film 27. The P-type single crystalline silicon substrate 1a is then etched from the rear surface thereof to a predetermined depth using the patterned silicon nitride film 27 as an etching mask. Next, as shown in FIG. 9, the silicon nitride film 27 is removed to etch the P-type single crystalline silicon substrate 1a by a predetermined amount from the rear surface. Consequently, the single crystal silicon substrate 1 of a predetermined thickness t1 and having thin portions 9, 12 is formed. In the etching process from the rear surface to form thin portions, a well-known electrochemical etching method can be used.

Then, the silicon nitride film 26 of the main surface side is patterned to have an opening along the regions to be etched out as the space between the regions for the frame body 2 and the regions for the vibratory element 3. Using this patterned silicon nitride film 26 as a mask, the single crystalline silicon substrate 1 is dry-etched from the main surface thereof to remove the single crystal silicon substrate 1 for an unnecessary region, thereby dividedly forming the frame body 2 and the tuning fork-shaped vibratory element 3. After the whole silicon substrate 1 is oxidized, the oxide and nitride films for predetermined regions are removed to make contact holes.

The aluminum electrodes (pad) 17–23 and wirings (not shown) are formed by a series of aluminum deposition, sintering, and patterning. After a protective film and a bonding pad are formed and die-cutting is made, a single-chip angular velocity sensor element is finally produced.

Figure 15:
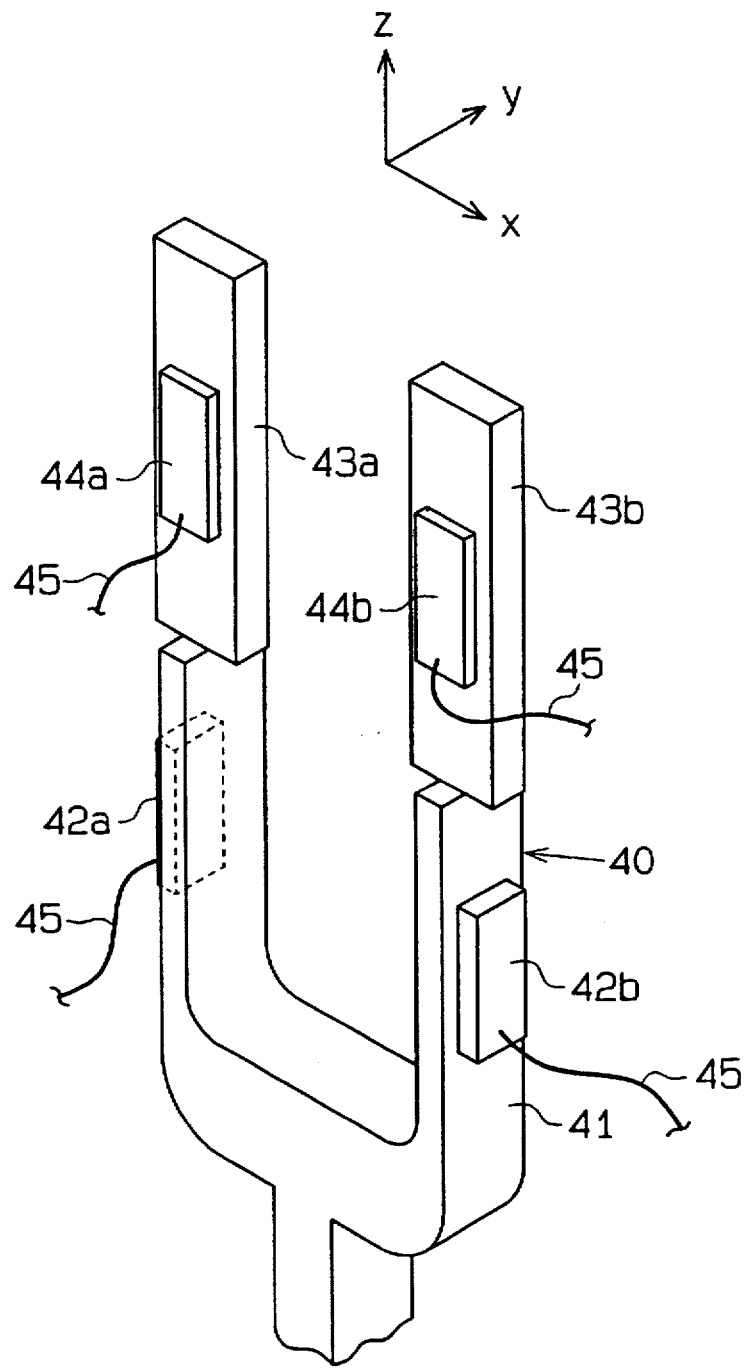
FIG. 15 is a perspective view of a conventional angular velocity sensor.

As described above, the manufacturing method using silicon micromachining technology makes processing and fabrication needed for a conventional structure in FIG. 15 unnecessary.

The operation of an angular velocity sensor element fabricated as above is hereinafter described.

Figure 10:
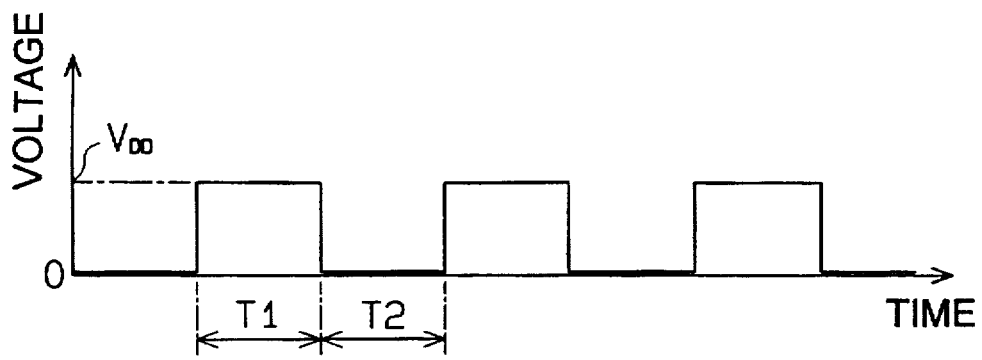
FIG. 10 is a diagram showing a wave form pattern of driving voltage of the angular velocity sensor of the first embodiment.

Since grounding potential is applied to the electrode 21 disposed at the bottom part 2a of the frame body 2, the vibratory element 3 has also grounding potential. Pulse voltage (excitation voltage) shown in FIG. 10 is applied to the electrodes 22 and 23 disposed at the side parts 2c and 2d of the frame body 2. That is, while predetermined voltage $V_{DD}$ is imposed during ON period T1, grounding potential is imposed during OFF period T2. When the predetermined voltage $V_{DD}$ is applied to the electrodes 22 and 23, electrostatic force generates between the arm 4 of the vibratory element 3 and the side part 2c of the frame body 2, and between the arm 5 and the side part 2d of the frame body 2, so that the arms 4 and 5 are attracted to the side parts 2c and 2d of the frame body 2, respectively as illustrated with an arrow A in FIG. 2. As a result, the tops of the arms 4 and 5 move in the direction further away from each other. On the other hand, when the grounding voltage is applied to the electrodes 22 and 23, the tops of the arms 4 and 5 move in the direction close to each other as illustrated with an arrow B in FIG. 2 due to rigidity (restitutive force) of the arms 4 and 5. With the repetition of such a movement, the arms 4 and 5 excitedly vibrate opposite to each other in the x axial direction with resonant frequency v.

Figure 11:
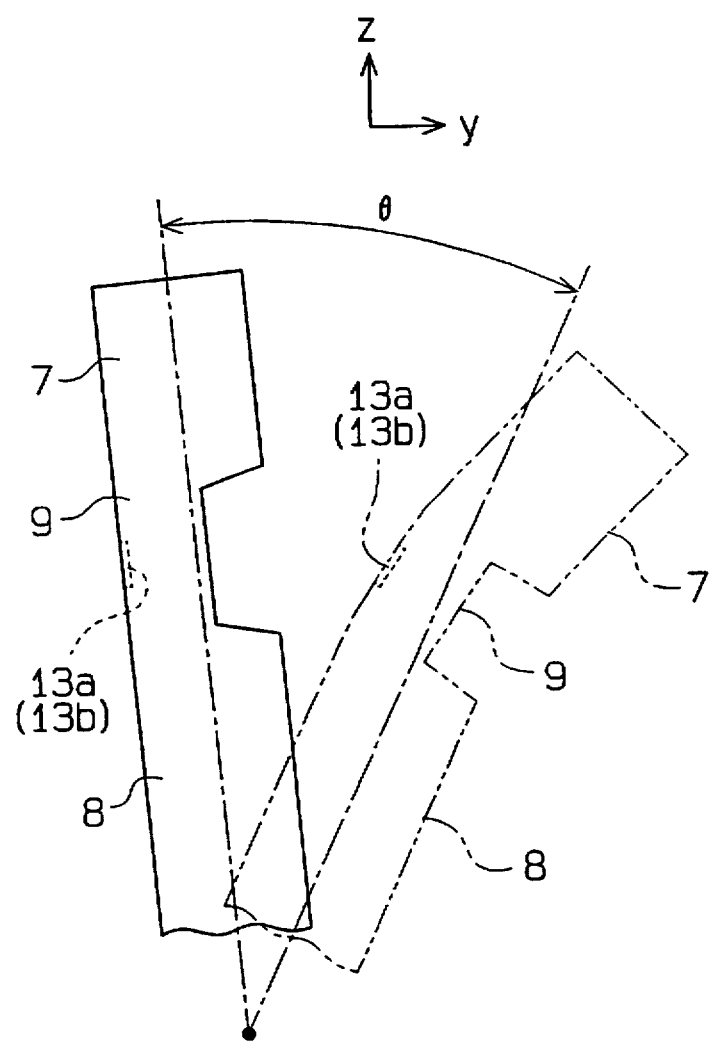
FIG. 11 is an explanatory view of operation of the angular velocity sensor of the first embodiment.

When angular velocity ω around the z axial direction is imposed during the excitation of the arms 4 and 5, Coriolis force is applied to the arms 4 and 5, which vibrates the arms 4 and 5 opposite to each other in the y axial direction with a certain vibration v. In proportion to the Coriolis force at this moment, resistant values of the piezo-resistant elements 13a, 13b, 14a and 14b vary. As shown in FIG. 11, the base (the anchored portion) of the arms 4 and 5 has a vibration angle θ shown with a one-dot chain line, however, the thick portion 7 closer to the top than the thin portion 9 can further bend to have a wider vibration angle. Thus, larger strain generates in the thin portion 9, so that the resistant values of the piezo-resistant elements 13a and 13b vary largely. The variation of the resistant values is detected as voltage change by the bridge circuit in FIG. 3, and moreover, the differential amplifier 24 amplifies and outputs the potential difference between the detecting electrodes 19 and 20 in the bridge circuit. The output from the differential amplifier 24 is in proportion to the size of the imposed angular velocity. Although only one arm 4 is illustrated in FIG. 11, the other arm 5 has the same operation.

According to the present embodiment, since the vibratory element 3 is made of silicon, the thin portions 9 and 12 are formed between the thick portions 7, 8, 10 and 11 on the arms 4 and 5, and the piezo-resistant elements 13a, 13b, 14a and 14b (strain sensitive elements) for detecting angular velocity are disposed on the thin portions 9 and 12, the angular velocity sensor element can be manufactured by silicon micromachining technology with stabilized characteristics, lower cost and higher sensitivity.

Because piezoelectric elements were placed with an adhesive in the conventional structure shown in FIG. 15, fluctuation of characteristics was larger due to positioning difference. In the present embodiment, however, the piezo-resistant elements are disposed by implanting ions without using an adhesive, so that the piezo-resistant elements can be disposed at desired positions precisely, and thus, the stabilized characteristics can be obtained. Furthermore, unlike the conventional sensor, it is unnecessary to prepare a driving plate 41 and detecting plates 43a and 43b separately and stick them together so as to be perpendicular to each other. Accordingly, it becomes possible to manufacture a smaller-sized angular velocity sensor element with reduced cost. Furthermore, since the piezo-resistant elements 13a, 13b, 14a and 14b are disposed on the thin portions 9 and 12 formed partially on the arms 4 and 5, the thick portions 7 and 10 at the top can function as masses (weight portions). Accordingly, strain induced at the thin portions 9 and 12 becomes larger enabling detection of the imposed angular velocity with higher sensitivity.

In the conventional structure shown in FIG. 15, lead wires 45 extend from vibrating portions (a vibratory element), weakening the bond strength of the soldered portion of the lead wire 45 due to vibration. However, in the present structure, the piezo-resistant elements are electrically connected to the electrodes 17–23 on the non-vibratory frame body 2 via a wiring composed of impurity diffusion regions, and then bonding wires 57 are bonded to the electrodes 17–23. Therefore, the fixed portion of the bonding wire can be precluded from being weakened by vibration. Consequently, a sensor with higher reliability can be provided.

Since the piezo-resistant elements 13a, 13b, 14a and 14b as strain sensitive elements are formed by diffusing impurities to the single crystalline silicon, the strain sensitive elements can be formed easily by using ordinary technology to manufacture a semiconductor device.

Moreover, the structure, which is characterized by the vibratory element 3, is formed by etching out a part of the silicon substrate 1; the side parts 2c and 2d (fixed electrodes) of the frame body 2 are formed face to face with a predetermined space from the arms 4 and 5 of the vibratory element 3; and application of electrostatic force between the arms 4 and 5 and the side parts 2c and 2d of the frame body 2 excites the arms 4 and 5 to vibrate. This structure allows forming the side parts 2c and 2d of the frame body 2 and the vibratory element 3 precisely and easily by using ordinary technology to manufacture a semiconductor device. In addition, excitation of the arms 4 and 5 can be easily done.

The arms 4 and 5 of the vibratory element 3 are electrically separated from the side parts 2c and 2d of the frame body 2 by PN junction, so that electric isolation can be achieved without difficulties by using ordinary technology to manufacture a semiconductor device.

Next, a second embodiment is hereinafter described focusing on the differences between the first and the second embodiments.

Figure 12:
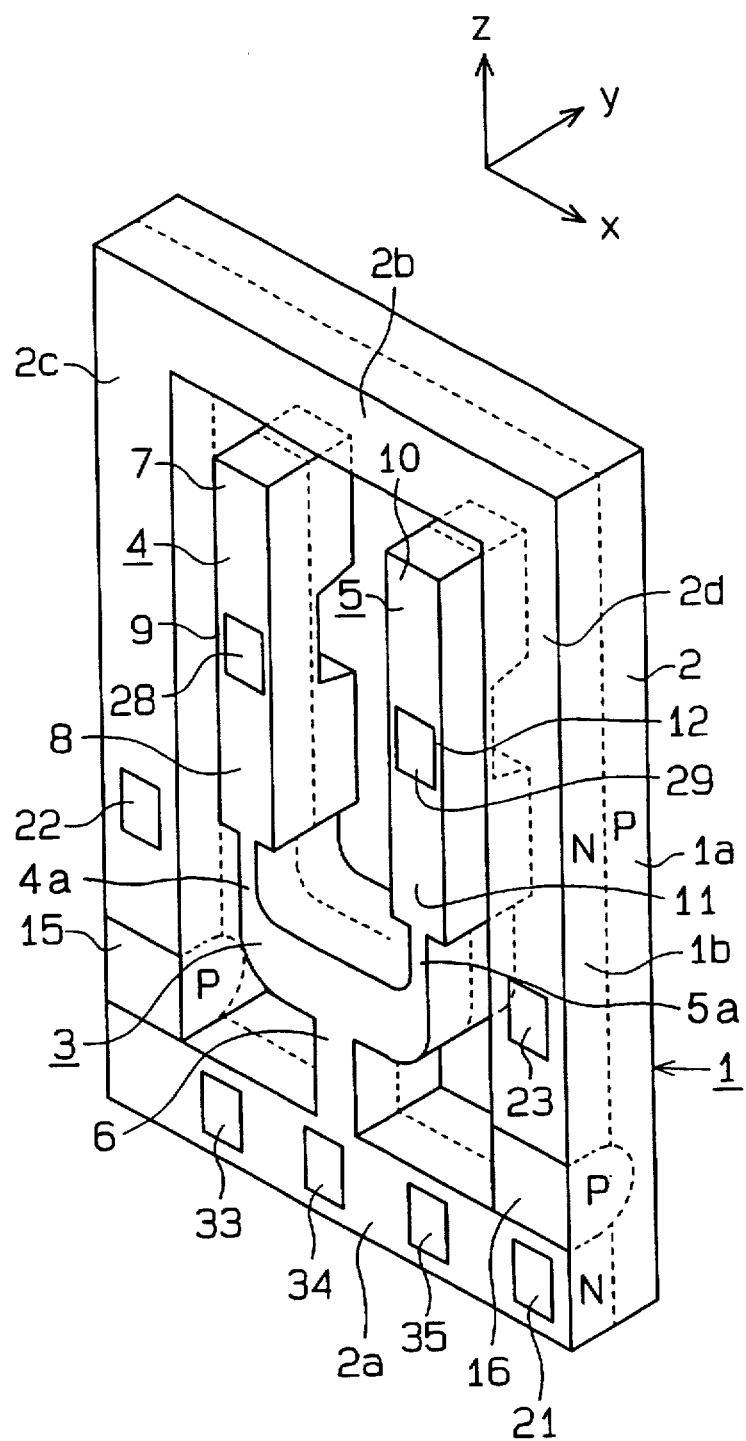
FIG. 12 is a perspective view of an angular velocity sensor element of a second embodiment.

The present embodiment uses piezoelectric elements 28 and 29 instead of the piezo-resistant elements as shown in FIG. 12.

Figure 13:
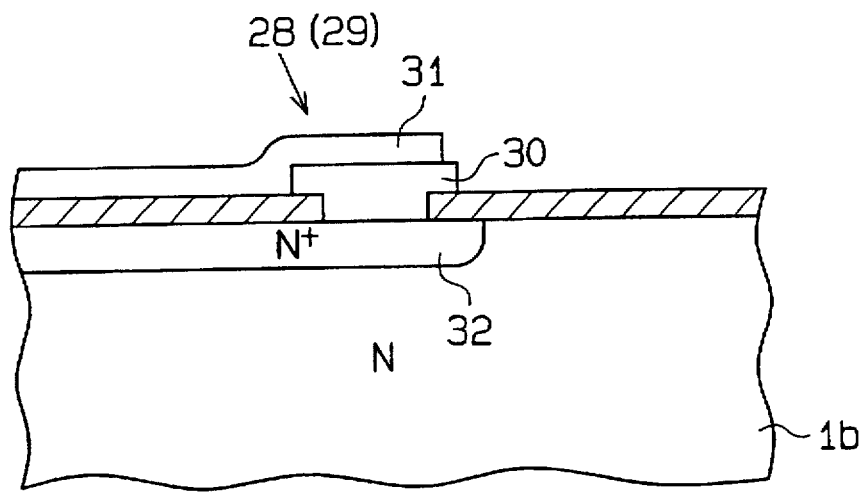
FIG. 13 is a partially enlarged sectional view of the angular velocity sensor element of the second embodiment.

The piezoelectric elements 28 and 29 disposed on the thin portions 9 and 12 of the arms 4 and 5, respectively are thin films 30 formed on the N-type silicon layer 1b as illustrated in FIG. 13 and consist chiefly of a piezoelectric material (PZT, ZnO, and the like). The piezoelectric thin film 30 is formed by depositing on a silicon substrate 1b a piezoelectric material using spattering method and patterning by etching into a predetermined shape. An upper electrode 31 made of an aluminum thin film is disposed on the piezoelectric thin film 30 while a lower electrode 32 made of an impurity diffusion region is disposed under the piezoelectric thin film 30.

Electrodes (bonding pads) 33, 34 and 35 are disposed at the bottom part 2a of the frame body 2 as shown in FIG. 12.

Figure 14:
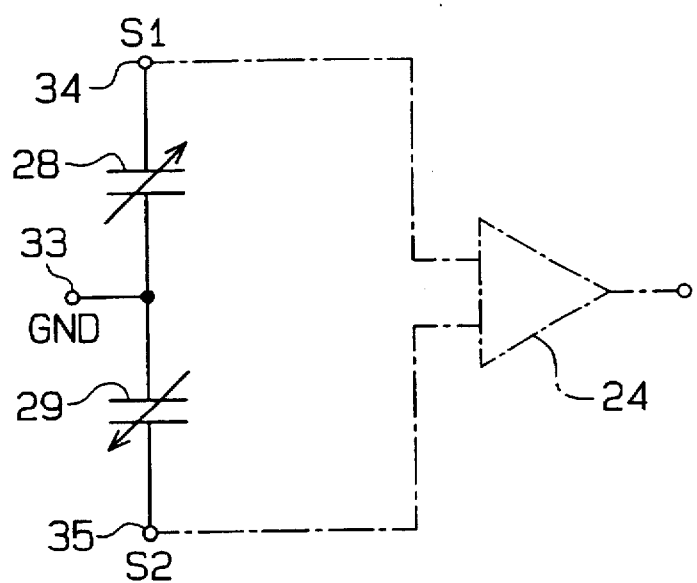
FIG. 14 is an electric circuit diagram illustrating an electric construction of the angular velocity sensor of the second embodiment.

FIG. 14 shows an electrical connection of the piezoelectric elements 28 and 29, which are connected in series. The connection node between the piezoelectric elements 28 and 29 is connected to a grounding electrode 33. One end of the series circuit of the two piezoelectric elements 28 and 29 is connected to a detecting electrode 34 while the other end is connected to the other detecting electrode 35.

Electric potential between the electrodes 34 and 35 is amplified and output as an electric signal by the differential amplifier 24.

Similar to the first embodiment, by applying grounding potential to the electrode 21 disposed at the bottom part 2a of the frame body 2 while applying excitation voltage shown in FIG. 10 to the electrodes 22 and 23 disposed at the side parts 2c and 2d of the frame body 2, the vibratory element 3 is excited to vibrate, and larger stress is imposed on the thin portions 9 and 12 in accordance with an application of angular velocity. In response to this imposed stress, the thin-film piezoelectric elements 28 and 29 on the thin portions 9 and 12 generate larger electric charge. Therefore, the applied angular velocity can be detected by measuring this electric charge.

As a modification of the present invention, piezoelectric force can be utilized instead of electrostatic force used in the aforementioned embodiments for exciting the vibratory element 3.

A trench can be formed in the N-type silicon layer 1b as a substitute for the method to electrically separate the vibratory element 3 from the side parts 2c and 2d disposed face to face as fixed electrodes of the frame body 2, so that the trench can isolate and separate them from each other. The trench can be filled with silicon oxide or polysilicon.

Furthermore, the top part 2b of the frame body 2 can be omitted. The top part 2b in the aforementioned embodiments functions to maintain the square ring-shaped frame body 2 as well as to secure a certain distance between the side parts 2c and 2d so that the side parts 2c and 2d resist to the generation of electrostatic force between with the vibratory element 3.

Furthermore, the strain sensitive element should not be disposed only corresponding to the thin portion of the arm. It may be adequate for the strain sensitive element to be disposed so that a part thereof is disposed corresponding to the thin portion.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An angular velocity sensor apparatus comprising:
   a vibratory element having arms in a tuning-fork shape extending parallel to each other, said vibratory element being composed of semiconductor substance, each of said arms having a thin portion disposed between thick portions so that said arm is capable of bending at said thin portion in a direction perpendicular to a plane including said arms;

an exciting means for exciting said vibratory element so that said arms of said vibratory element vibrate in an excitation direction in said plane and perpendicular to said arms; and strain sensitive elements disposed on said thin portions of said respective arms, each of said strain sensitive elements detecting a bend of said respective arms responsive to an applied angular velocity.

2. An angular velocity sensor apparatus according to claim 1, wherein said exciting means comprises fixed electrodes disposed facing said arms to cause electrostatic force between said arms and said fixed electrodes, respectively.

3. An angular velocity sensor apparatus according to claim 2, wherein said vibratory element and said fixed electrodes are provided on a same semiconductor substrate.

4. An angular velocity sensor apparatus according to claim 3, wherein said semiconductor substrate comprises isolation regions electrically isolating between said fixed electrodes and said vibratory element.

5. An angular velocity sensor apparatus according to claim 4, wherein said isolation regions are diffusion regions forming PN junction isolation.

6. An angular velocity sensor apparatus according to claim 1, wherein:

said semiconductor substance is single crystalline silicon; and said strain sensitive elements are semiconductor piezo-resistant elements formed at said thin portions.

7. An angular velocity sensor apparatus according to claim 2, wherein:

said semiconductor substance is single crystalline silicon; and said strain sensitive elements are semiconductor piezo-resistant elements formed at said thin portions.

8. An angular velocity sensor apparatus according to claim 3, wherein:

said semiconductor substance is single crystalline silicon; and said strain sensitive elements are semiconductor piezo-resistant elements formed at said thin portions.

9. An angular velocity sensor apparatus according to claim 4, wherein:

said semiconductor substance is single crystalline silicon; and said strain sensitive elements are semiconductor piezo-resistant elements formed at said thin portions.

10. An angular velocity sensor apparatus according to claim 5, wherein:

said semiconductor substance is single crystalline silicon; and said strain sensitive elements are semiconductor piezo-resistant elements formed at said thin portions.

11. An angular velocity sensor apparatus according to claim 1, wherein:

said semiconductor substance is single crystalline silicon; and said strain sensitive elements are thin-film piezoelectric elements formed on said thin portions.

12. An angular velocity sensor apparatus according to claim 2, wherein:

said semiconductor substance is single crystalline silicon; and said strain sensitive elements are thin-film piezoelectric elements formed on said thin portions.

13. An angular velocity sensor apparatus according to claim 3, wherein:

said semiconductor substance is single crystalline silicon; and said strain sensitive elements are thin-film piezoelectric elements formed on said thin portions.

14. An angular velocity sensor apparatus according to claim 4, wherein:

said semiconductor substance is single crystalline silicon; and said strain sensitive elements are thin-film piezoelectric elements formed on said thin portions.

15. An angular velocity sensor apparatus according to claim 5, wherein:

said semiconductor substance is single crystalline silicon; and said strain sensitive elements are thin-film piezoelectric elements formed on said thin portions.

16. An angular velocity sensor apparatus comprising:

a semiconductor substrate patterned to have a tuning-fork shape part and a frame part surrounding and supporting said tuning-fork shape part, said tuning-fork shape part having arms extending parallel to each other, each of said arms having a free end and a thin portion disposed between thick portions so that said arm is capable of bending at said thin portion due to a vibration induced in a direction perpendicular to a plane including said arms;

fixed electrodes provided on sides of said frame part to which said arms of said tuning-fork shape part face, respectively, wherein an excitation voltage is applied between said fixed electrodes and said tuning-fork shape part to excite said tuning-fork shape part so that said arms vibrate in an excitation direction in said plane and perpendicular to said arms; and strain sensitive elements disposed on said thin portions of said respective arms, each of said strain sensitive elements detecting a bend of said respective arms responsive to an applied angular velocity.

17. An angular velocity sensor apparatus according to claim 16, wherein said semiconductor substrate comprises isolation regions electrically isolating between said fixed electrodes and said tuning-fork shape part.

18. An angular velocity sensor apparatus according to claim 17, wherein said isolation regions are diffusion regions forming PN junction isolation.

19. An angular velocity sensor apparatus according to claim 16, wherein:

said semiconductor substrate is composed of single crystalline silicon; and said strain sensitive elements are piezo-resistant diffusion regions formed at said thin portions.

20. An angular velocity sensor apparatus according to claim 17, wherein:

said semiconductor substrate is composed of single crystalline silicon; and said strain sensitive elements are piezo-resistant diffusion regions formed at said thin portions.

21. An angular velocity sensor apparatus according to claim 18, wherein:

said semiconductor substrate is composed of single crystalline silicon; and said strain sensitive elements are piezo-resistant diffusion regions formed at said thin portions.

22. An angular velocity sensor apparatus according to claim 16, wherein:
said semiconductor substrate is composed of single crystalline silicon; and
said strain sensitive elements are piezoelectric thin-films formed on said thin portions.

23. An angular velocity sensor apparatus according to claim 17, wherein:
said semiconductor substrate is composed of single crystalline silicon; and
said strain sensitive elements are piezoelectric thin-films formed on said thin portions.

24. An angular velocity sensor apparatus according to claim 18, wherein:
said semiconductor substrate is composed of single crystalline silicon; and
said strain sensitive elements are piezoelectric thin-films formed on said thin portions.

25. An angular velocity sensor apparatus according to claim 16, wherein said frame part is provided with bonding pads electrically connected to said fixed electrodes, said tuning-fork shape part and said strain sensitive elements, respectively.

26. An angular velocity sensor apparatus according to claim 17, wherein said frame part is provided with bonding pads electrically connected to said fixed electrodes, said tuning-fork shape part and said strain sensitive elements, respectively.

27. An angular velocity sensor apparatus according to claim 18, wherein said frame part is provided with bonding pads electrically connected to said fixed electrodes, said tuning-fork shape part and said strain sensitive elements, respectively.

28. An angular velocity sensor apparatus according to claim 19, wherein said frame part is provided with bonding pads electrically connected to said fixed electrodes, said tuning-fork shape part and said strain sensitive elements, respectively.

29. An angular velocity sensor apparatus according to claim 22, wherein said frame part is provided with bonding pads electrically connected to said fixed electrodes, said tuning-fork shape part and said strain sensitive elements, respectively.

30. An angular velocity sensor apparatus according to claim 25, wherein said tuning-fork shape part is provided with a diffusion region electrically connecting said strain sensitive element and said bonding pad.

31. An angular velocity sensor apparatus according to claim 26, wherein said tuning-fork shape part is provided with a diffusion region electrically connecting said strain sensitive element and said bonding pad.

* * * * *